United States Patent [19]

Pauc

[11] Patent Number: 4,934,856
[45] Date of Patent: Jun. 19, 1990

[54] ATTACHMENT ON THE WHEEL RIM OF COMPONENTS NECESSARY FOR MONITORING A TIRE

[75] Inventor: Gilbert Pauc, Cebazat, France

[73] Assignee: Compagnie Generale des Etablissements Michelin - Michelin & Cie, Clermont-Ferrand, France

[21] Appl. No.: 360,454

[22] Filed: Jun. 2, 1989

[30] Foreign Application Priority Data

Jun. 13, 1988 [FR] France ................................ 88 07977

[51] Int. Cl.$^5$ ............................................... F16B 1/00
[52] U.S. Cl. ...................................... 403/24; 403/194; 403/288; 411/542
[58] Field of Search ............... 285/159; 16/2; 411/542; 403/194, 201, 24, 288

[56] References Cited

U.S. PATENT DOCUMENTS

| 3,456,705 | 7/1969 | Tinnerman | 411/542 X |
| 3,466,595 | 9/1969 | Boutilier | 403/194 X |
| 4,634,307 | 1/1987 | Gnaedinger | 403/194 |
| 4,715,756 | 12/1987 | Danico et al. | 411/542 X |

FOREIGN PATENT DOCUMENTS

| 3242291 | 5/1984 | Fed. Rep. of Germany . |
| 1413603 | 8/1965 | France . |
| 2142001 | 1/1973 | France . |
| 2584346 | 1/1987 | France . |

Primary Examiner—Andrew V. Kundrat
Attorney, Agent, or Firm—Oblon, Spivak, McClelland, Maier & Neustadt

[57] ABSTRACT

A support in which the electric elements for the monitoring of a tire are incorporated is immobilized on a wheel rim by the use of a locking element which includes two sealing lips.

5 Claims, 1 Drawing Sheet

ATTACHMENT ON THE WHEEL RIM OF COMPONENTS NECESSARY FOR MONITORING A TIRE

BACKGROUND OF THE INVENTION

1. Field of the Invention

This invention relates to monitoring tires. In particular, it relates to a unit intended to attach on a wheel rim some of the elements necessary for monitoring tires.

2. Description of the Related Art

In most of the tire monitoring devices, one or more sensors, optionally associated with electronic components, are buried in the tire enclosure itself in order to be sensitive to the prevailing inside the enclosure, and/or to other parameters such as the temperature. In this application, these elements will generally be designated by "electric components." Also found outside the enclosure of the tire are means for assuring the connection to the vehicle, for example a coil if inductive coupling is used, or else any other suitable means.

It is necessary to make connections between these electric components buried in the tire enclosure and the means of connections placed outside the enclosure, generally radially on the inside face of the wheel rim. Consequently, it is essential to make a wheel rim bushing and then it is necessary to assure the seal at this location.

Further, industrial constraints impose designing an attachment of electric components on the wheel rim as simple and reliable as possible.

The space requirements inside the wheel rim of the braking elements and of the joints and/or suspension elements is such that any protuberance radially toward the inside of the wheel rim is proscribed.

Supports are known whose base on the wheel rim resembles a valve base: a rubber seal surrounds the opening and rests on the two inside and outside faces of the wheel rim (see for example French patent application 2 597 411). Such a fastening is bulky on the side radially inside the wheel rim. Fastenings of the nut and bolt type are known also. Generally, a seal is placed on the side radially inside the wheel rim. This poses the same space problem and the seal must therefore be attached radially inside the wheel rim, therefore inside the tire enclosure. It is necessary then to compress the seal between three parts: the wheel rim, the part equivalent to the bolt and the part equivalent to the nut. This poses tolerance problems and therefore affects reliability.

SUMMARY OF THE INVENTION

Accordingly, the object of this invention is to propose a novel unit to be attached on the wheel rim, which is compact, located outside the tire enclosure, and whose cost, when applied to the wheel rim, is as low as possible.

According to the invention, the unit maintains electric components on a wheel rim and assures a required seal between a tire enclosure and the outside, the electric components being necessary for monitoring the state of the tire. The unit comprises, a support having a shaft and a head, the electric component being incorporated in the shaft which, in an assembled position, penetrates inside the tire enclosure with the head resting against the face of the wheel rim outside the tire enclosure to assure locking of the support in a direction of its axis and in a direction toward the inside of the tire enclosure. The unit also comprises a locking element surrounding the shaft, the locking element assuring the retention of the support in a direction toward the outside of the tire enclosure, wherein the sealing means are connected to the locking element and are used to assure the seal between the locking element and the shaft on one hand and between the locking element and the wheel rim on the other hand.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
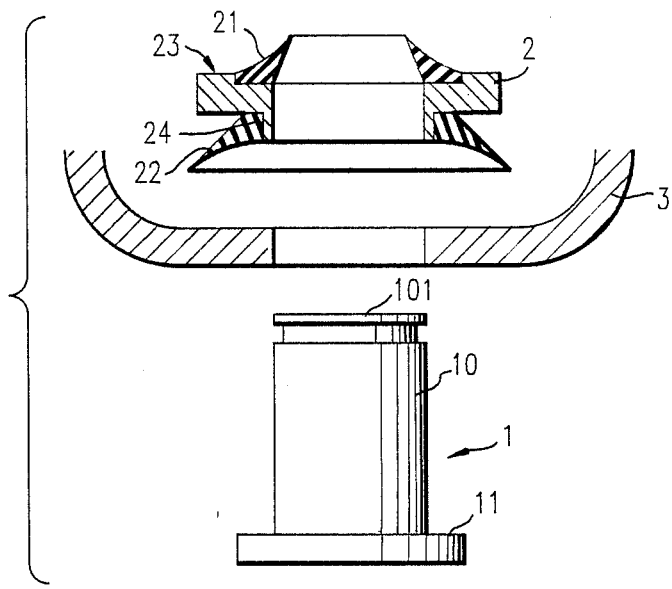
FIG. 1 is an exploded view of the unit according to the present invention.

It is seen that the unit comprises a support 1 and a locking element 2. Support 1 consists of a shaft 10 ending on one side in a head 11. Shaft 10 encloses a cavity in which all the electric components are incorporated. Head 11 forms a mechanical stop which is able to lock the movement of the support in one direction, just like the head of a bolt.

The sealing means are all integral with locking element 2. The number of parts of the unit is therefore small, which facilitates the installation on the wheel rim. To limit the space requirements of the unit outside the tire enclosure, these sealing means are fastened inside the enclosure. The seal presses, on one hand, against shaft 10 and, on the other hand, against the wheel rim whereas the mechanical immobilization is guaranteed by the head in one direction and by the locking element in the other direction, the latter, of course, working with the shaft. In the illustration of the invention, the connection of shaft 10 and locking element 2 is provided by a clip 25 engaging in a groove 101 made on shaft 10. However, a friction connection can suffice for counteracting the ejection force resulting from the inflation pressure and the centrifugal force on locking element 2. A locking bolt can be considered also. A locking clip makes possible a simplified assembly of the unit. The faces of the unit which abut the wheel rim can be rigid since they do not have to provide the sealing function. The immobilization of the support on the wheel rim is therefore excellent whereas in units where the same element provides both the seal and the support, vibrations and/or centrifugal force can cause rocking of the supports which themselves cause breaking of the seal. It has thus been found that it is very advantageous to separate the immobilization functions on the wheel rim and the seal. Actually, the mechanical stress of the seals alters, over time, their sealing performance.

The sealing means used here consist of two lips 21 and 22, of which one lip 21 is integral with upper section 23 of locking element and of which the other lip 22 is integral with outside cylindrical face 24 of the locking elements. The first 21 of these lips is intended to rest on shaft 1 of support 1 and the second 22 is intended to rest on wheel rim 3. The first lip 21 therefore assures the seal between shaft 10 and locking element 2, and the second 22 between locking element 2 and wheel rim 3. The inflation pressure itself reinforces the seal thus achieved because it acts on a single face of the lips. Moreover, since lips 21 and 22 are easily deformable, they assume slight variations of surface evenness very well. This is very advantageous for lip 22 acting on wheel rim 3. Contrary to an arrangement resorting to a standard seal, it is not necessary here to perform any preparation of surface 30 of wheel rim 3 on which lip 22 rests: the latter can remain tapered as it is naturally, whereas in the case of a seal acting, for example, between head 11 and wheel rim 3, it would be necessary to level the bearing surface of the seal on wheel rim 3, which imposes an additional operation on the wheel rim, or else to provide a seal of sufficient thickness to support a nonhomogeneous crushing while assuring the seal. Moreover, such lips 21, 22 are molded on the locking element 2 which leads to a simple and compact locking and sealing system.

Figure 2:
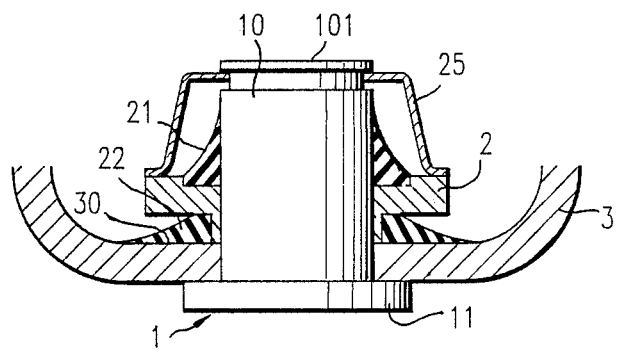
FIG. 2 shows the unit in an assembled state with the unit being mounted on the wheel rim.

A prestressing of lips 21, 22 can be achieved to favor the seal setting by shaping the latter so that they rest, after assembly, on the faces with which they must work, as is seen by comparing FIGS. 1 and 2.

Therefore, it is seen that the solution proposed by this invention is very advantageous: the preparation of the wheel rim and the installation of the unit on wheel rim 3 is simplified due to the design of the locking element 2. The latter can be achieved very economically for example by molding on a washer, or on a nut or other, according to the solution considered for the contact between shaft 1 and locking element 2.

Obviously, numerous modifications and variations of the present invention are possible in light of the above teachings. It is therefore to be understood that within the scope of the appended claims, the invention may be practiced otherwise than as specifically described herein.

What is new and desired to be secured by Letters Patent of the U.S. is:

1. A unit for maintaining electric components on a wheel rim and providing a required seal between a tire enclosure and the outside, said unit being mounted on said wheel rim when said unit is in an assembled position, said unit comprising:
   a support having a shaft and a head, the electric components being incorporated in said shaft, wherein said shaft, when said unit is in said assembled position, extends inside the tire enclosure with said head resting against the face of the wheel rim outside the tire enclosure, whereby said head comprises means for locking the support against movement in a direction of the axis of said support and in a direction toward the inside of the tire enclosure;
   a locking element surrounding said shaft, said locking element being mounted on said shaft and comprising means for retaining said support against movement in a direction toward the outside of the tire enclosure; and
   sealing means connected to said locking element and comprising means for sealing between the locking element and the shaft and between the locking element and the wheel rim.

2. Unit according to claim 1, wherein said sealing means comprises two lips, one of said lips being integral with an upper section of said locking element and resting on said shaft, the other of said lips being integral with a outside cylindrical face of said locking element and resting on said wheel rim.

3. Unit according to claim 2, wherein the head, shaft and locking element are all substantially rigid.

4. Unit according to claim 1, including means mounted on the upper end of said shaft for connecting said shaft and said locking element.

5. Unit according to claim 4, wherein said means for connecting said shaft and said locking element is a clip fitting in a groove of said shaft and pressing on said locking element.

* * * * *